United States Patent

Ito et al.

[11] Patent Number: 5,959,407
[45] Date of Patent: Sep. 28, 1999

[54] VEHICLE LIGHTING DRIVE APPARATUS

[75] Inventors: Toshiharu Ito, Matsuzaka; Takafumi Oshima, Nagoya; Yoshihiko Komura, Nisshin; Minoru Yasuda, Nagoya; Noriyasu Sugimoto, Konan; Toshinori Iida, Ise, all of Japan

[73] Assignee: NGK Spark Plug Co., Ltd., Nagoya, Japan

[21] Appl. No.: 08/985,580

[22] Filed: Dec. 5, 1997

[30] Foreign Application Priority Data

Dec. 7, 1996 [JP] Japan .................................. 8-342527
Dec. 26, 1996 [JP] Japan .................................. 8-358820
Jan. 24, 1997 [JP] Japan .................................. 9-025865

[51] Int. Cl.$^6$ .................................................. B60Q 1/02
[52] U.S. Cl. .............................. 315/82; 315/57; 315/276; 361/836
[58] Field of Search ................................ 315/77, 82, 70, 315/85, 57, 241 S, 276, 282; 362/61, 65, 201, 265, 836; 439/642

[56] References Cited

U.S. PATENT DOCUMENTS 4,480,211 10/1984 Eggers ..................................... 315/70
5,124,895 6/1992 Segoshi et al. ........................ 315/85 X
5,264,997 11/1993 Hutchisson et al. .................... 362/226
5,356,314 10/1994 Aota ........................................ 439/642

FOREIGN PATENT DOCUMENTS 195 21070A1 12/1995 Germany .
196 10385A1 9/1997 Germany .
57-176602 10/1982 Japan .
59-130002 7/1984 Japan .
7-114805 5/1995 Japan .
8-315624 11/1996 Japan .
8-315630 11/1996 Japan .
8-315631 11/1996 Japan .

Primary Examiner—Haissa Philogene
Attorney, Agent, or Firm—Morgan, Lewis & Bockius LLP

[57] ABSTRACT

A socket portion is provided to project from one side surface of a transformer receiving portion to thereby form a body case, and a lighting transformer is received in the transformer receiving portion so that a high voltage side output end of a secondary coil of the lighting transformer is electrically connected to a terminal provided in the socket portion and a primary coil of the lighting transformer is connected to an external electric path directly or through a circuit portion. Accordingly, the transformer receiving portion and the socket portion are integrally formed with each other to thereby form a unit structure.

8 Claims, 18 Drawing Sheets

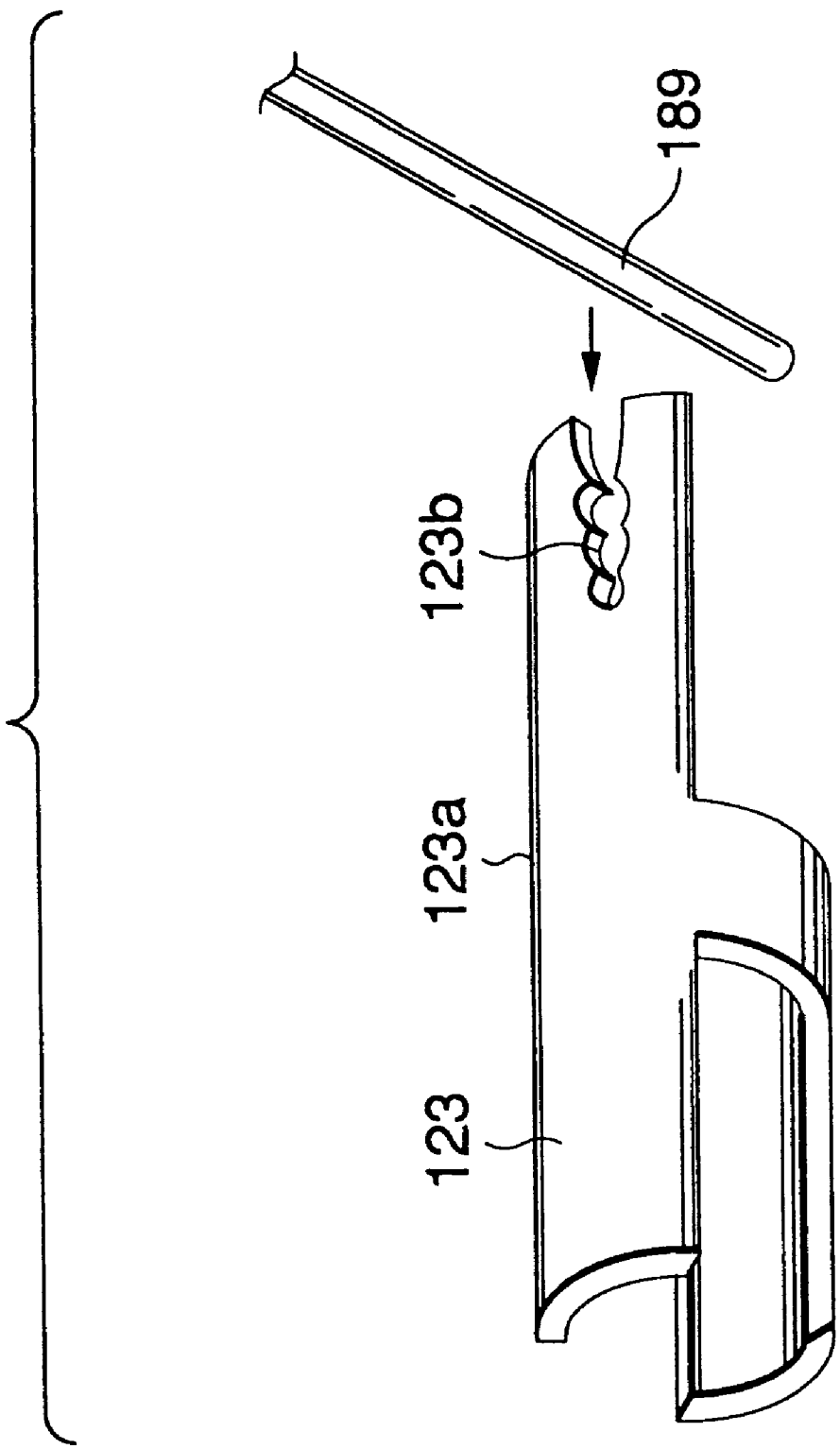

VEHICLE LIGHTING DRIVE APPARATUS

BACKGROUND OF THE INVENTION

1. Field of the Invention

The present invention relates to a vehicle lighting actuating apparatus in which a vehicle electric discharge lamp such as a head light, or the like, is mounted.

2. Description of the Related Art

In an electric discharge lamp such as a metal halide lamp, or the like, used as a head light, electrodes of the electric discharge lamp are detachably attached to an electric discharge lamp socket held in the front portion of a vehicle so that electromotive power is supplied through a terminal of the socket. In the case of a head light, a high voltage of 13 kV or more is applied to the electric discharge lamp. Therefore, a voltage of about 400 V is boosted by a transformer to generate a high voltage at an output end of a secondary coil and it is connected to a terminal of a socket to thereby apply a voltage to the electric discharge lamp. In such a configuration, conventionally, the lighting transformer is provided outside a lamp housing in which an electric discharge lamp socket is provided and a high-voltage cable connected to the secondary coil output end of the lighting transformer is introduced into the lamp housing and connected to the terminal of the socket.

In the aforementioned conventional configuration, the disposed socket and the transformer are separately provided and connected to each other through a high-voltage cable. Accordingly, because the number of constituent parts increases, mounting of those parts is troublesome. There are further various problems that the high-voltage cable becomes an obstacle to design of the arrangement; electromagnetic wave is generated around the high-voltage cable to cause the maloperation of an electronic control circuit provided in a vehicle; voltage loss is generated because of the high-voltage cable; and the like.

Therefore, a vehicle lighting actuating apparatus has been proposed which comprises: a body case constituted by a transformer receiving portion, and a socket projected from one side surface of the transformer receiving portion for receiving a vehicle electric discharge lamp; and a lighting transformer received in the transformer receiving portion of the body case and including a core box having an iron core portion, a coil bobbin formed from an electrically insulating material and fitted onto the iron core portion, a secondary coil wound on the outer circumference of the coil bobbin and having a high voltage output end lead out from a wiring hole formed in the iron core portion and connected to terminals provided in the socket, and a primary coil electrically connected to an external electric path directly or indirectly through a circuit portion.

Further, a vehicle lighting actuating apparatus has been proposed which comprises: a body case constituted by a transformer receiving portion, and a socket projected from one side surface of the transformer receiving portion for receiving a vehicle electric discharge lamp; and a lighting transformer received in the transformer receiving portion of the body case and including a core box having an iron core portion, a coil bobbin formed from an electrically insulating material and fitted onto the iron core portion, a secondary coil wound on the outer circumference of the coil bobbin and electrically connected to terminals provided on the socket, and a primary coil wound on the circumference of the iron core portion and electrically connected to an external electric path directly or indirectly through a circuit portion.

In such a configuration, the body case having the transformer receiving portion, and the socket integrated with the transformer receiving portion is used so that the lighting transformer and the terminals of the socket are connected to each other in the inside of the body case. Accordingly, there arises an advantage that not only a single structure is obtained but also the high-voltage cable connecting the lighting transformer and the socket is unnecessary.

Further, in such a configuration, in order to facilitate electrical connection of the terminal of the socket to the high-voltage output end of the secondary coil of the lighting transformer, a configuration has been proposed in which: a connection tube portion is formed in the center of the coil bobbin so as to pierce the iron core portion so that the inside of the connection tube portion is used as a wiring hole and that the connection tube portion is made to coincide with the center of the socket; and a high-voltage output end of the secondary coil is led out to the wiring hole so as to be connected to the connection terminal of the socket.

The socket is preferably located substantially in the center position of the body came in order to secure a stable mounting form in the lamp housing. If the lighting transformer T is held in the center of the body case C as shown in FIG. 13, a space s surrounding the lighting transformer T in the housing C is, however, divided into two, upper and lower parts. Accordingly, the space for receiving a wiring member such as a printed-wiring substrate, or the like, cannot be secured sufficiently even by using the space s, so that not only one part of the space s is unsatisfactory but also the other part of the space s in which no wiring member is received is wasteful.

On the other hand, if the lighting transformer T is biased to one of the upper and lower sides with respect to the body case C as shown in FIG. 14, the space s to receive the wiring member can be secured sufficiently in the other side. Because the socket D is, however, eccentric with respect to the body case C, design of arrangement in the lamp housing becomes troublesome. Further, because the outer circumference of the socket D may project from the housing, the external appearance of the vehicle lighting actuating apparatus is distorted so that the design of arrangement thereof becomes more and more troublesome.

SUMMARY OF THE INVENTION

It is an object of the present invention to provide a vehicle lighting actuating apparatus in which the number of constituent parts is reduced and no high-voltage cable is required as well as a socket portion is located as near the center of a body case as possible and a wide connection space can be secured in a body case thereof.

The present invention provides a vehicle lighting actuating apparatus comprising a body case having a transformer receiving portion and a socket portion provided to project from one side of the transformer receiving portion so that a vehicle discharge lamp is to be connected to the socket portion; and a lighting transformer received in the transformer receiving portion of the body case, the lighting transformer having a primary coil connected to an external electric path directly or through a circuit portion, and a secondary coil electrically connected to a terminal provided in the socket portion.

In such a configuration, a lighting transformer and a terminal of a socket portion are connected to each other inside a body case including a transformer receiving portion, and the socket portion formed integrally with the transformer receiving portion. Accordingly, the structure is provided as a unit so that no high-voltage cable is required for connecting the lighting transformer and the terminal.

The present invention provides a vehicle lighting actuating apparatus comprising: a body case having a transformer receiving portion and a socket provided to project from one side surface of the transformer receiving portion so that a vehicle electric discharge lamp is to be connected to the socket portion; and a lighting transformer received in the transformer receiving portions, the transformer including a core box with an iron core, a coil bobbin foarmed from an electrically insulating material and mounted in the core box so as to be fitted onto the iron core portion, a primary coil wound on the iron core portion and a secondary coil wound on an outer circumference of the coil bobbing, the secondary coil being electrically connected at its ends to a high voltage side center terminal and a low voltage side outer terminal provided in the socket, the primary coil being electrically connected to an external electric path directly or indirectly through a circuit portion; wherein a connection tube portion having a wiring hole in its inside is formed in the coil bobbin so that the connection tube portion is passed through the iron core portion, and provided to be eccentric to one side with respect to an annular winding path of the secondary coil on the coil bobbin, and wherein the lighting transformer is disposed in the body case so that the connection tube portion substantially coincides with the socket, and a high voltage side output end of the secondary coil inserted into the wiring hole is connected to the high voltage side center terminal of the socket.

In such a configuration, even in the case where the lighting transformer is disposed so as to be biased to one side in the body case, the connection tube portion can be disposed near the center of the body case if the eccentric connection tube portion is positioned so as to be biased to the other side.

Accordingly, the socket can be located near the center of the body case correspondingly to the arrangement of the connection tube portion. Furthermore, because the lighting transformer is disposed in the body case so as to be biased to one side of the body case, a wall-arranged space can be generated in the other side. When this space is used as a connection space to perform electrical connection to an external electric path, necessary electric connection can be secured while the size of the body case is prevented from increasing.

BRIEF DESCRIPTION OF THE DRAWINGS

In the accompanying drawings:

FIG. 22 is a perspective view of a connection terminal having an extension portion according to the fourth embodiment of the present invention.

PREFERRED EMBODIMENTS OF THE INVENTION

Figure 1:
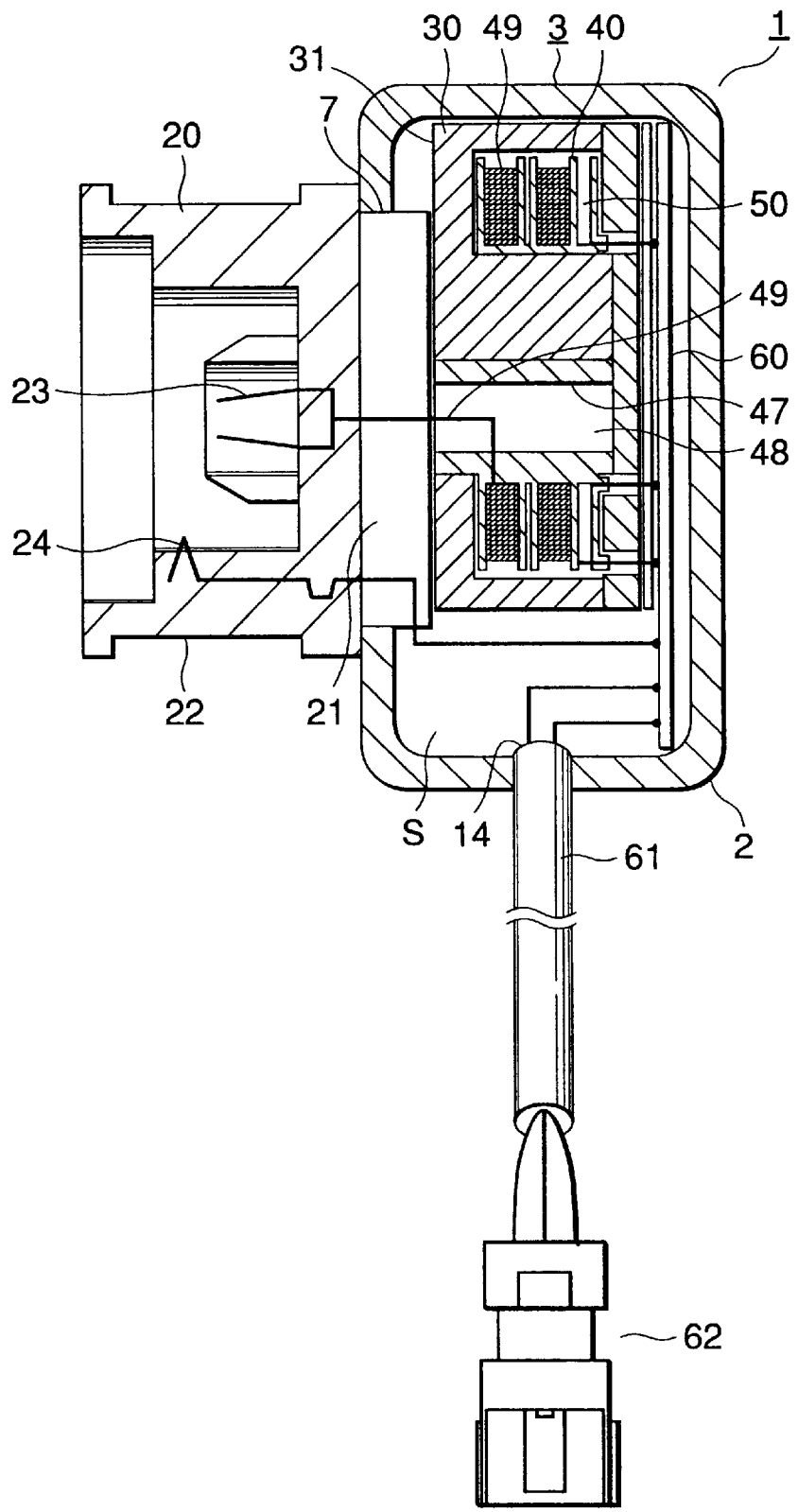
FIG. 1 is a vertical sectional side view of a vehicle lighting actuating apparatus according to a first embodiment of the present invention.
Figure 2A:
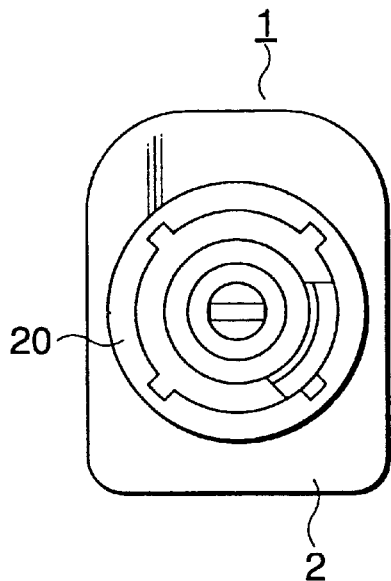
FIGS. 2A, 2B and 2C are a front view, a bottom view and a side view showing the external appearance of the vehicle lighting actuating apparatus according to the first embodiment of the present invention.
Figure 2C:
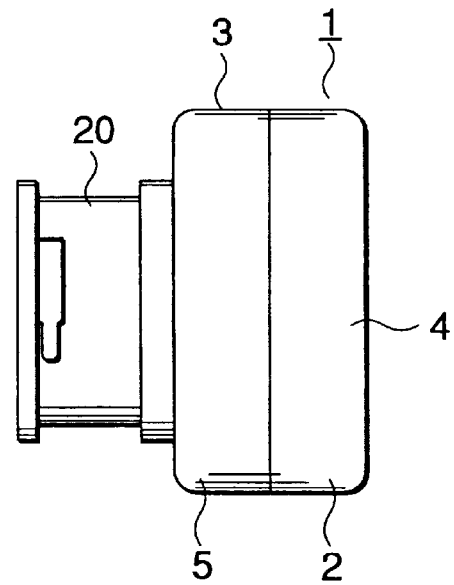
Figure 2B:
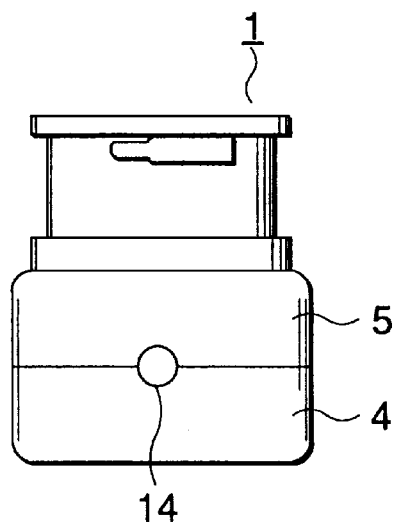

Preferred embodiment according to the present invention will be described as follows referring to the accompanying drawings.

A first embodiment of a vehicle lighting actuating apparatus 1 according to the present invention will be described below with reference to FIGS. 1 through 10.

The vehicle lighting actuating apparatus 1 is constituted by a body case 2 including a transformer receiving portion 3 and a synthetic resin socket 20, and a lighting transformer 30.

Rectangular parallelepiped synthetic resin half box portions 4 and 5 each having a side surface opened in the form of the same end surface are put one another to thereby form the transformer receiving portion 3 of the body case 2. Further, the front half box portion 5 has an opening 7 formed in its front wall. Further, a hole 14 for insertion of an external lead wire 61 is formed in the lower surface of the transformer receiving portion 3.

On the other hand, the socket 20 includes a mount base portion 21 fitted to the opening 7, and a cylindrical connection portion 22 formed in the front surface of the mount base portion 21. A high voltage side center terminal 23 is put in the center of the connection portion 22 and a low voltage side outer terminal 24 is put along the inner circumferential surface of the connection portion 22 so that the terminals 23 and 24 project from the back surface of the mount base portion 21 so as to be connected to lead portions. Although this configuration shows the case where the socket 20 is provided separately, the invention may be applied also to the case where the socket 20 is formed integrally with the front half box portion 5. As will be described later, the socket 20 is positioned substantially in the center of the body case 2.

The configuration of the lighting transformer 30 will be described below with reference to FIGS. 3 through 9.

Figure 3:
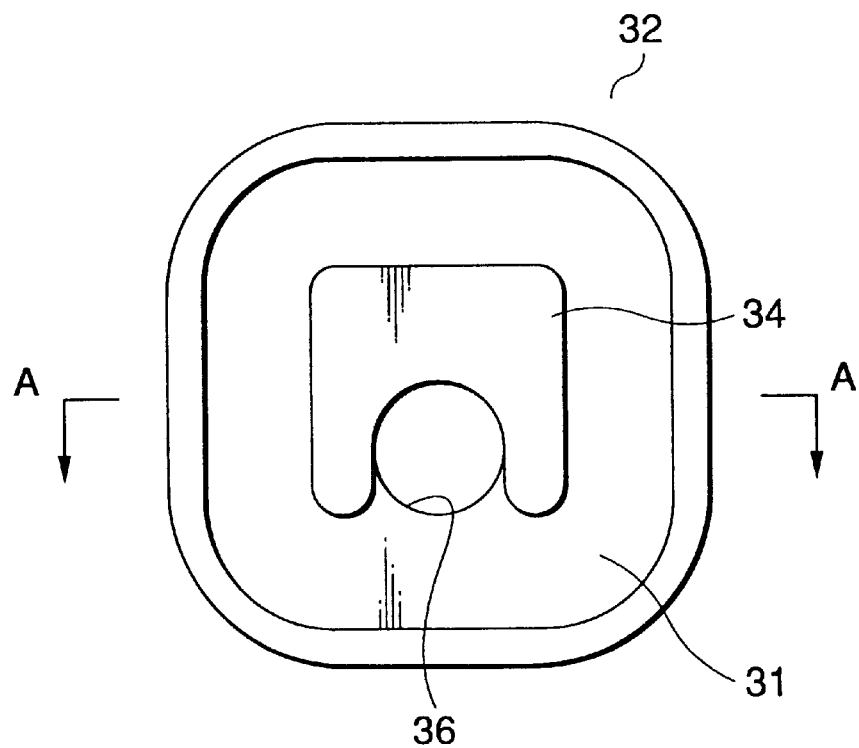
FIG. 3 is a side view of a split core portion according to the first embodiment of the present invention.
Figure 4:
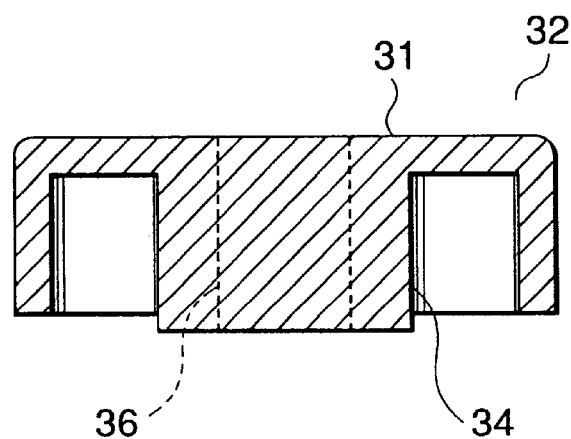
FIG. 4 is a sectional view taken along the line A—A in FIG. 3.

The lighting transformer 30 has a coil bobbin 40 received in a square core box 31 having circular-arc-like corners. Split core portions 32 and 33 having equal outer diameters and formed of a magnetic material such as ferrite, or the like, are placed one upon the other to thereby form the core box 31. As shown in FIGS. 3 and 4, one split core portion 32 has an iron core portion 34 formed in the center, and a fitting hole 36 formed in an eccentric position so as to pierce the iron core portion 34. The iron core portion 34 is substantially sectionally shaped like a square having one cavity side. Further, the outer circumference of the split core portion 32 is shaped substantially like a square having circular-arc-like corners correspondingly to the iron core portion 34.

Figure 5:
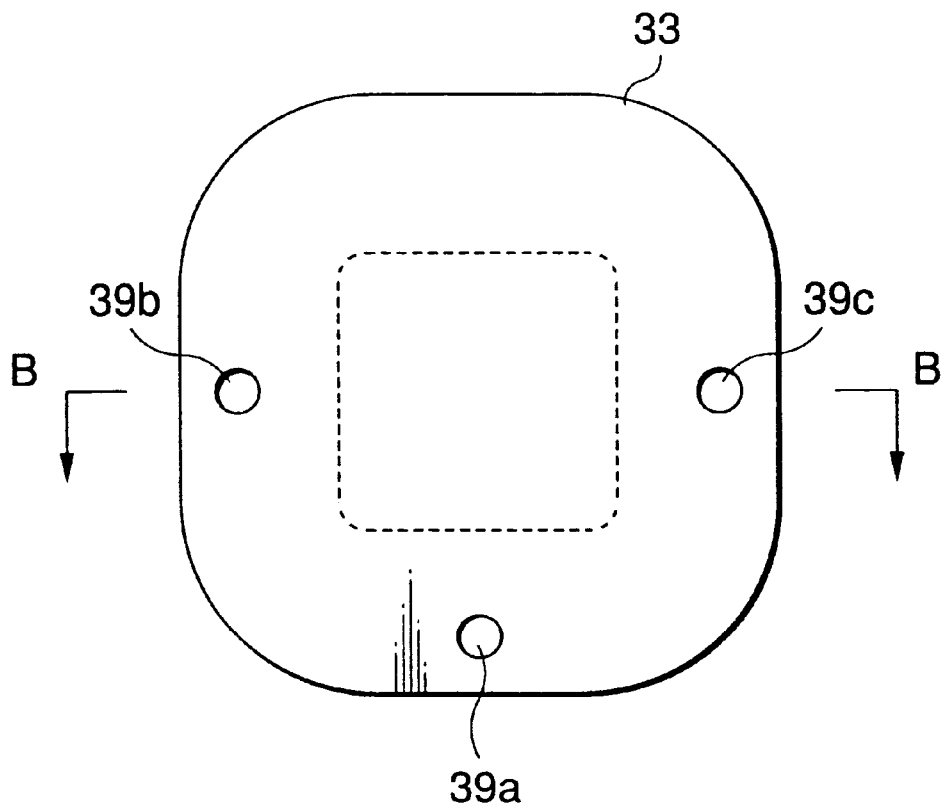
FIG. 5 is a side view of a split core portion according to the first embodiment of the present invention.
Figure 6:
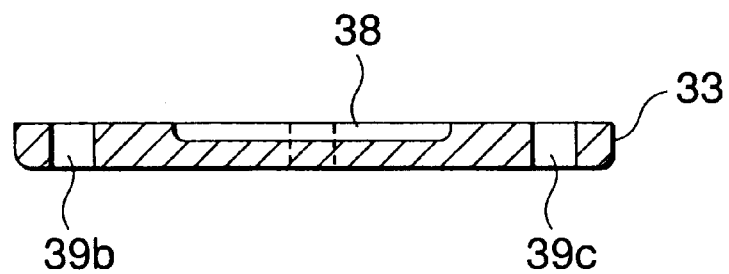
FIG. 6 is a sectional view taken along the line B—B in FIG. 5.
Figure 7:
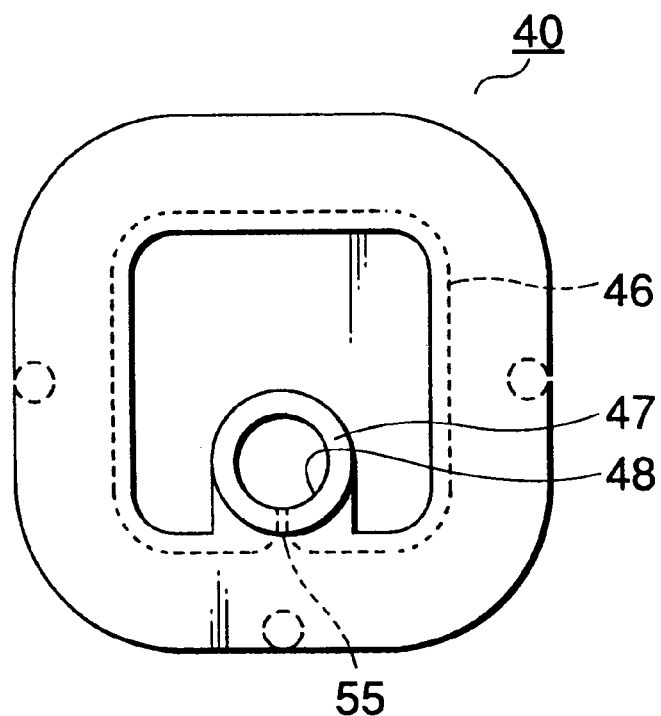
FIG. 7 is a side view of a coil bobbin according to the first embodiment of the present invention.
Figure 8:
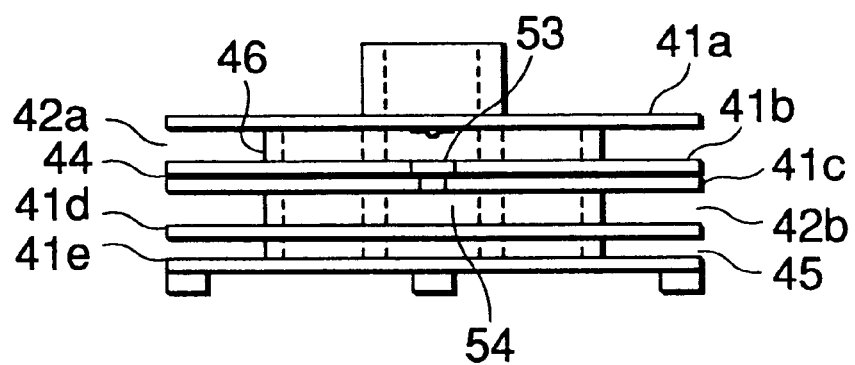
FIG. 8 is a bottom view of the coil bobbin according to the first embodiment of the present invention.

Further, as shown in FIGS. 5 and 6, the split core portion 33 is shaped substantially like a square so as to be connected to the opening of the split core portion 32. A rectangular groove 38 is formed in the inner surface of the split core portion 33 so that the iron core portion 34 is put into the rectangular groove 38. Holes 39a, 39b and 39c for insertion of lead wires are formed in three side positions of the split core portion 33 respectively.

The coil bobbin 40 is formed from a synthetic resin material. As shown in FIGS. 7 through 10, the bobbin 40 includes: a bobbin base tube 46 shaped like a square having rounded corners so as to be fitted to the iron core portion 34; a plurality of flange portions 41a to 41e provided around the circumferential surface of the bobbin base tube 46; split circumferential grooves 42a and 42b continuously wound with a secondary coil 49; an intermediate circumferential groove 44 disposed between the split circumferential grooves 42a and 42b; and a split circumferential groove 45 wound with a primary coil 50. The circumferential grooves 42a, 42b, 44 and 45 are partitioned by the flange portions 41a to 41e. The circumferential grooves 42a, 42b, 44 and 45 form an annular winding path substantially shaped like a square.

Further, the coil bobbin 40 has a connection tube portion 47 formed for insertion of the iron core portion 34. The connection tube portion 47 is provided eccentrically so as to coincide with the fitting hole 36. An end portion of the connection tube portion 47 is inserted into the connection tube portion 36. The inside of the connection tube portion 47 is provided as a wiring hole 48.

Figure 10:
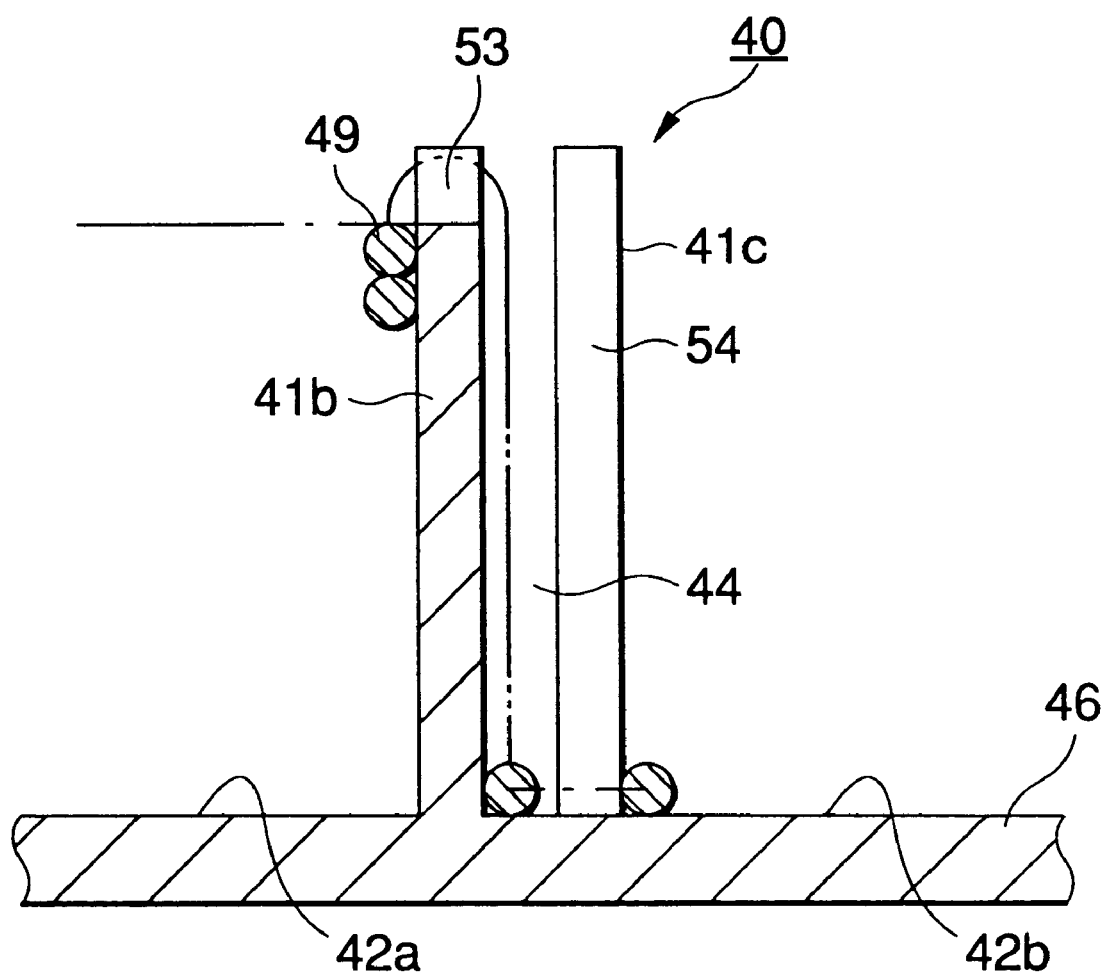
FIG. 10 is a vertical sectional side view of a part of the coil bobbin showing a process of winding a secondary coil according to the first embodiment of the present invention.

As shown in FIG. 10, a shallow groove 53 is formed in the flange portion 41b, and a slit 54 is formed in the flange portion 41c so as to have a depth reaching the groove surface of the split groove 42. A winding start of the secondary coil 49 is inserted into a through-hole 55 of the connection tube portion 47 in advance so as to face the inside of the wiring hole 48. The secondary coil 49 is then wound in the split circumferential groove 42a. A winding end of the secondary coil 49 is involved in the intermediate circumferential groove 44 so as to run over the flange portion 41b through the shallow groove 53 and further begins to be wound on the split circumferential groove 42b again from the groove surface of the split circumferential groove 42b over the slit 54 of the flange portion 41c. When winding is finished, the winding end of the secondary coil 49 is led out to the outside of the lighting transformer 30 through the insertion hole 39a. Consequently, the winding start of the secondary coil 49 is provided as a high voltage side output end whereas the winding end of the secondary coil 49 led out to the outside of the lighting transformer 30 is provided as a ground side (low voltage side) connection end.

For example, if the intermediate circumferential groove 44 and the slit 54 are not formed, the secondary coil 49 is returned at the top end of the flange portion 41c and delivered downward to the groove surface of the split circumferential groove 42a along the inner surface of the flange portion 41c, so that the secondary coil 49 is wound repeatedly on the vertical distance portion in a distorted form. Accordingly, a uniform winding state cannot be generated. Contrariwise, in the aforementioned configuration, as shown in FIG. 10, such a uniform winding state can be generated because the secondary coil 49 is wound slightly at the groove surface of the intermediate circumferential groove 44 and delivered to the split circumferential groove 42b through the slit 54 so as to begin to be wound from the groove surface of the split circumferential groove 42b.

Further, the primary coil 50 is wound on the split circumferential groove 45 by about twice, and then the high voltage end and low voltage end of the primary coil 50 are led out to the outside through the insertion holes 39b and 39c respectively.

Figure 9:
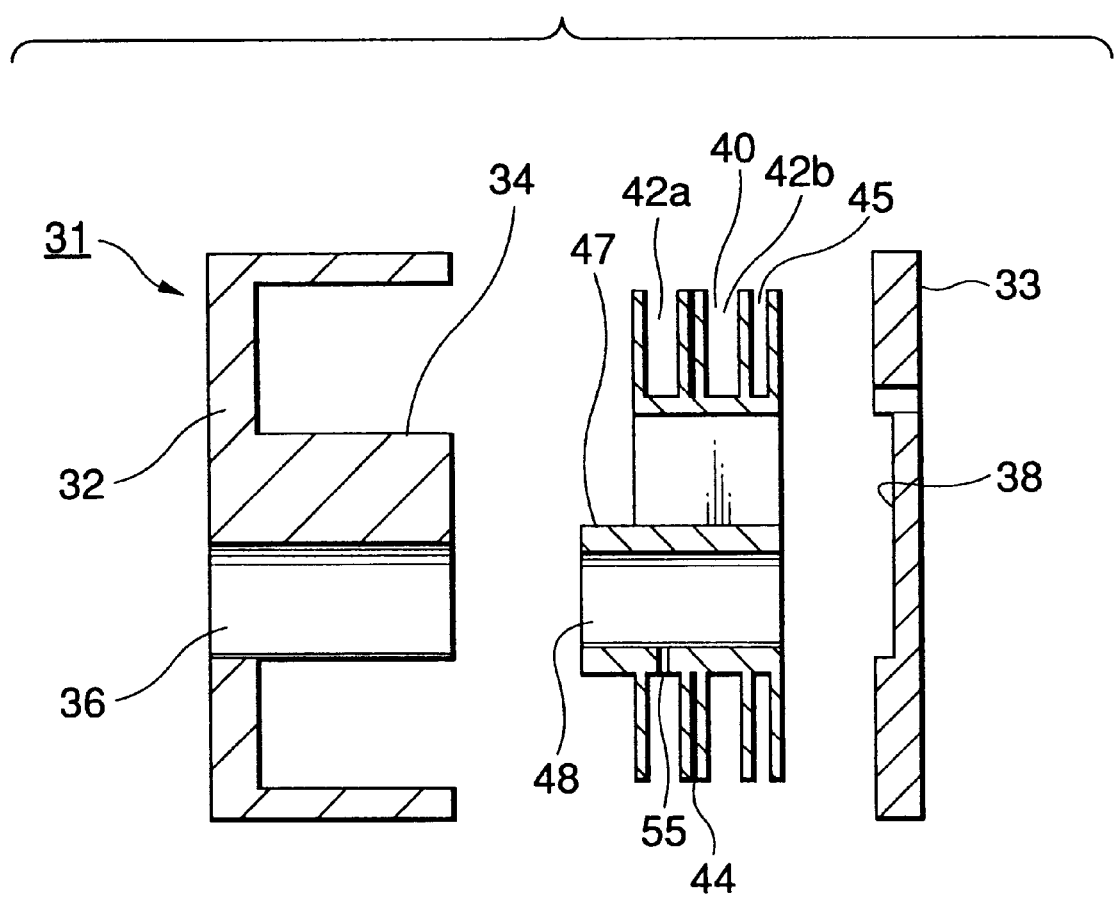
FIG. 9 is a vertical sectional side view showing a lighting transformer separated according to the first embodiment of the present invention.

As shown in FIG. 9, the connection tube portion 47 is then inserted into the fitting hole 36 of the split core portion 32, and further the split core portion 33 is attached to thereby form the lighting transformer 30. In this manner, the lighting transformer 30 is covered with the core box 31. Accordingly, the lighting transformer 30 has a uniform single structure, so that a good arrangement is obtained. When a simple space is formed in the transformer receiving portion 3 as described above, a uniform space can be generated in the body case. Furthermore, because the core box 31 is formed from a magnetic material, the number of constituent parts can be reduced if the iron core portion 34 is formed continuously.

Figure 11A:
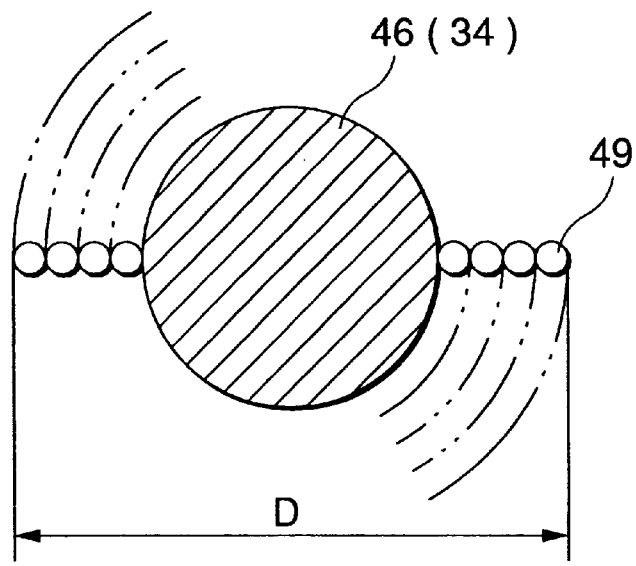
FIGS. 11A and 11B are conceptual views showing the relations between the dimensions D, L of the outermost layer of the secondary coil and the difference between a case where the sectional shape of the bobbin base tube (iron core portion) is circular and in a case where the sectional shape is quadrilateral, respectively.
Figure 11B:
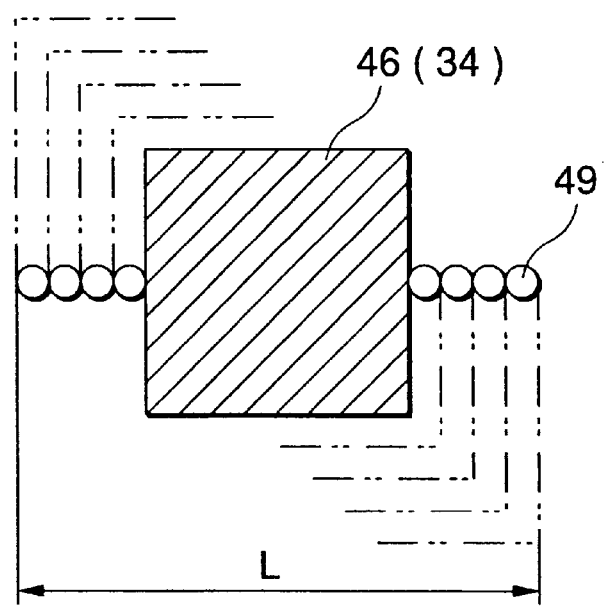

In the aforementioned configuration, because the bobbin base tube 46 is shaped like a square having rounded corners so as to be fitted to the iron core portion 34, the annular winding path is shaped substantially like a square so that the secondary coil 49 can be wounded substantially in the form of a square corresponding to the square of the annular winding path. Compared with the conventional bobbin having a circular bobbin base tube wound with a coil thereon, the external size of the bobbin can be reduced. That is, assuming that the wire diameter of the secondary coil 49, the number of windings in the secondary coil 49 and the sectional area of the iron core portion 34 through which magnetic flux passes in the inside of the secondary coil 49 are constant, as shown in FIGS. 11A and 11B, the outermost layer dimension L of the secondary coil 49 in FIG. 11A where the sectional shape of the bobbin base tube 46 (iron core portion 34) is quadrilateral becomes smaller than the outermost layer dimension D in FIG. 11B where the sectional shape of the bobbin base tube 46 is circular. Accordingly, when an equal voltage is to be taken out from the secondary side, the external size of the bobbin can be reduced more greatly so as to contribute to the reduction in size of the body case.

In the aforementioned configuration, the external shape of the core box 31 is substantially square in side view correspondingly to the bobbin base tube 46. Further, the connection tube portion 47 projects so as to be biased to one side. Therefore, the core box 31 is eccentrically disposed in a rectangular parallelepiped space formed in the body case 2 so that the eccentric side of the connection tube portion 47 is disposed near the center.

In the aforementioned arrangement, not only the core box 31 which has the external shape of a square can be disposed correctly in the rectangular parallelepiped space in the body case 2 but also the connection tube portion 47 can be located near the center of the body case 2 because of the eccentricity of the connection tube portion 47. Accordingly, the above-mentioned socket 20 can be also located near the center of the body case 2. By the arrangement, a correct and wide connection space S can be secured in the body case 2. Furthermore, when the low voltage side terminal 24 of the socket is disposed in a direction opposite to the eccentric direction of the lighting transformer, that is, in the lower portion of the center terminal 23 in FIG. 1, the rear portion of the terminal 24 can be made to face into the connection space S.

On the other hand, a printed wiring substrate 60 is attached to the half box portion 4 as shown in FIG. 1. The ground side connection end of the secondary coil 49 and opposite ends of the primary coil 50 are connected to the printed wiring substrate 60 at the back surface of the lighting transformer 30. Further, one side of the printed wiring substrate 60 is extended toward the connection space S so that an external lead wire 61 having a connector 62 at its leading end is connected to a necessary electric path on the extension end of the printed wiring substrate 60 and led out to the outside through the insertion hole 14.

The high voltage side output end of the secondary coil 49 led out of the core box 31 into the wiring hole 48 of the connection tube portion 47 is connected to the center terminal 23 of the socket 20. The outer terminal 24 of the socket is connected to the low voltage electric path (or ground electric path) of the printed wiring substrate 60 while the above-mentioned external lead wire 61 is connected to the printed wiring substrate 60.

In the aforementioned configuration, the voltage from the external lead wire 61 is connected to a necessary circuit of the printed wiring substrate 60. Accordingly, a primary side voltage of about 400 V is applied to the primary coil 50 through the circuit and boosted to 13 kV or more by the secondary coil 49, so that the high voltage thus generated is applied to the center terminal 23.

As shown in FIG. 1, the vehicle lighting actuating apparatus 1 configured as described above is attached to the lamp housing attached to a front portion in a car engine room, An electric discharge lamp (not shown) such as a metal halide lamp, or the likes, is fitted to the connection portion 22. The outer terminal 24 is connected to the surrounding electrode of the electric discharge lamp, and the center terminal 23 is connected to the center electrode of the electric discharge lamp. The high voltage of about 13 kV is applied between the electrodes so that lighting is performed. In this case, because the socket 20 is located near the center of the body case 2, design of arrangement in the lamp housing is facilitated.

Figure 12:
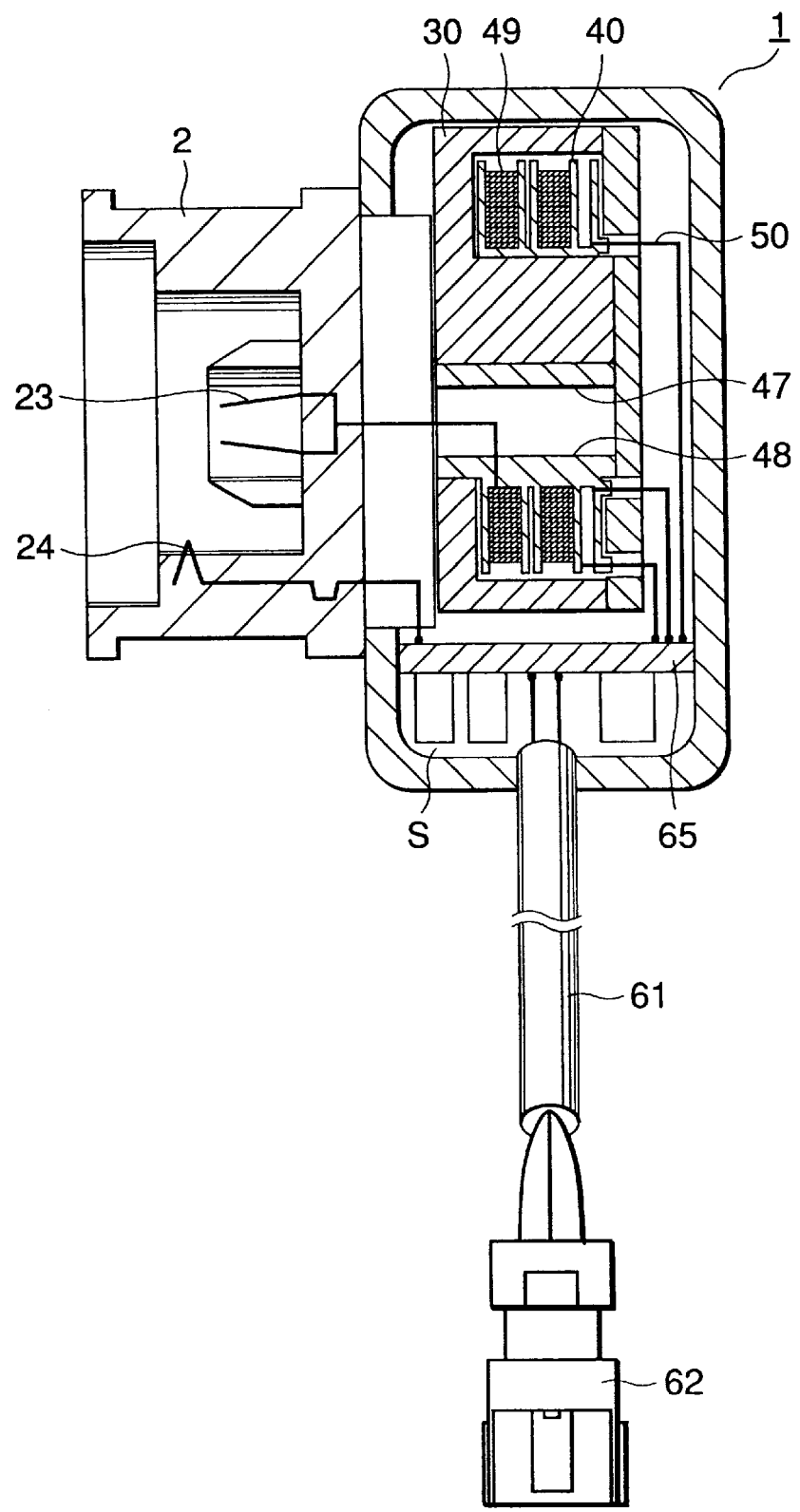
FIG. 12 is a vertical sectional side view of the vehicle lighting actuating apparatus according to a second embodiment of the present invention.
Figure 13:
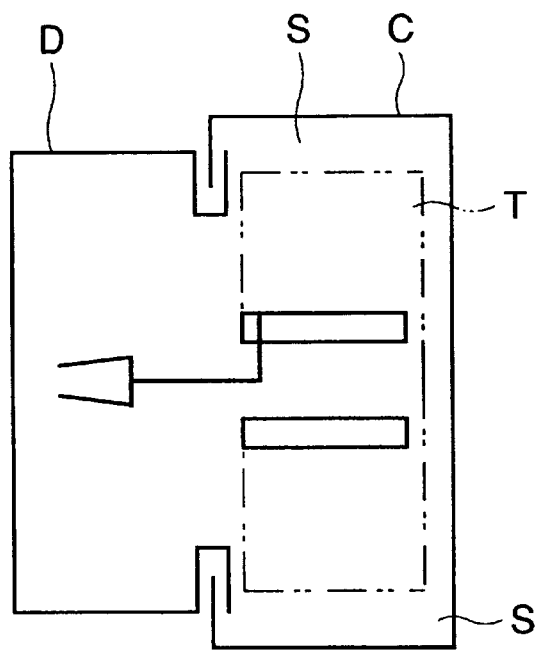
FIG. 13 is a conceptual view showing the positional relation between the body case C and the lighting transformer T in a conventional configuration.
Figure 14:
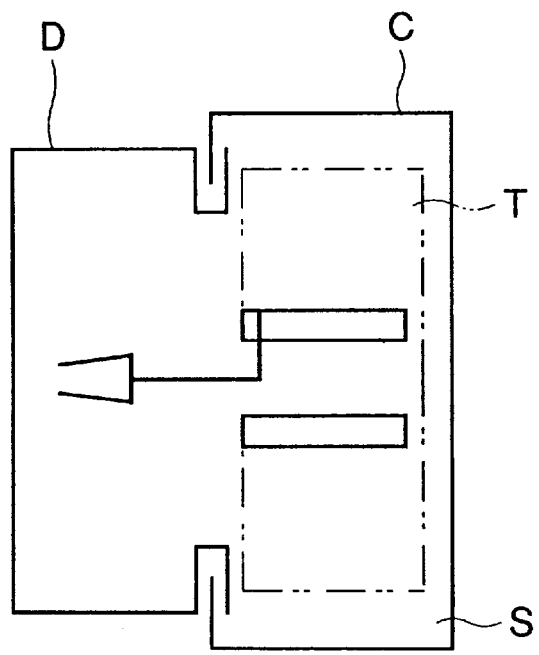
FIG. 14 is a conceptual view showing another positional relation between the body case C and the lighting transformer T in a conventional configuration.
Figure 15A:
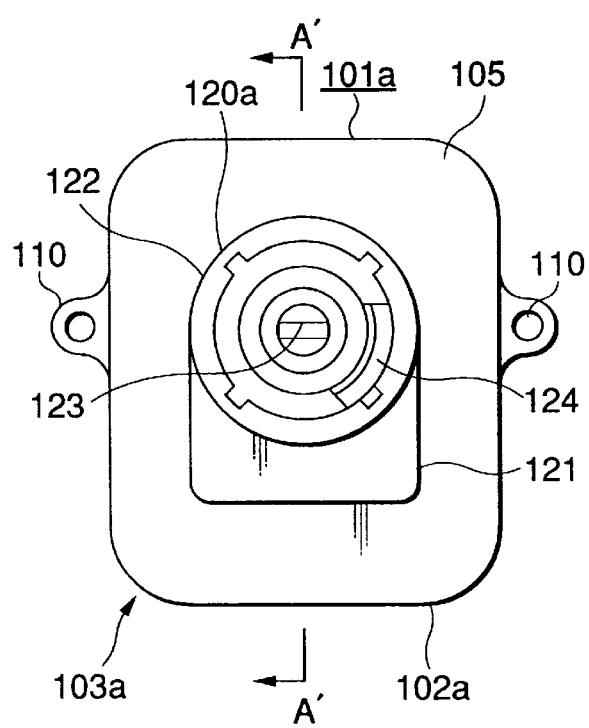
FIGS. 15A and 15B are front and side views of a vehicle lighting actuating apparatus according to a third embodiment of the present invention, respectively.
Figure 15B:
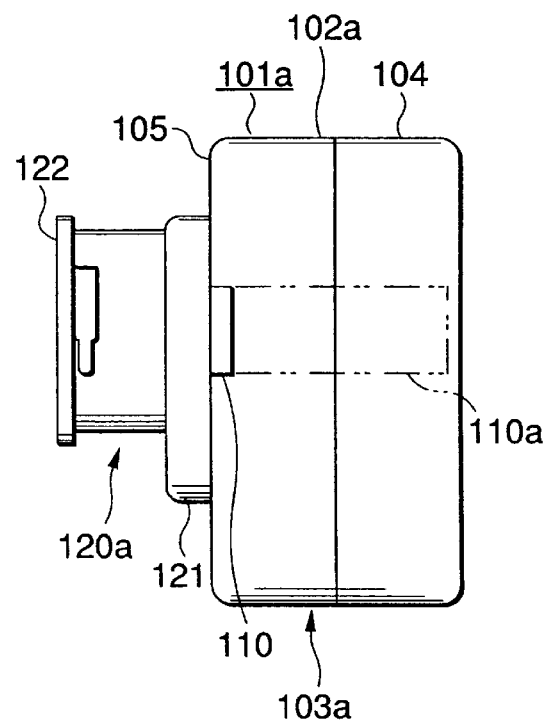

In the configuration of FIG. 1, the printed wiring substrate 60 is disposed in the back portion of the lighting transformer 30 and one end of the printed wiring substrate 60 is made to face into the connection space S so that electrical connection to the external lead wire 61 is performed by the extension end of the printed wiring substrate 60. Alternatively, according to a second embodiment of the present invention as shown in FIG. 12, a printed wiring substrate 65 may be disposed in the connection space S so as to cross in the front-rear direction. In this case, the low voltage side terminal 24 of the socket, the ground connection end of a secondary coil 49 and the input and output ends of a primary coil 50 may be connected to the printed wiring substrate 65, and an external lead wire 61 may be further connected to the printed wiring substrate 65.

As described above, the present invention is designed so that: a connection tube portion is formed in the coil bobbin so as to be biased to one side with respect to an annular winding path of the secondary coil of the coil bobbin; and the lighting transformer is disposed in the body case so that the connection tube portion substantially coincides with the socket; and a high voltage side output end of the secondary coil inserted into the wiring hole of the connection tube portion is connected to the high voltage side center terminal of the socket. Accordingly, even in the case where the lighting transformer is disposed so as to be biased to one side in the body case, the connection tube portion can be disposed near the center of the body case if the eccentric connection tube portion is positioned so as to be biased to the other side. Accordingly, the socket can be located near the center of the body case correspondingly to the arrangement of the connection tube portion and can be put well in the lamp housing. Furthermore, because the lighting transformer is disposed in the body case so as to be biased to one side of the body case, a wide connection space can be secured in the other side. When electrical connection to an external electric path is performed by this connection space, there arises an excellent effect that necessary electrical connection can be secured while the size of the body case is prevented from increasing, or the like.

A third embodiment of the vehicle lighting actuating apparatus 101a according to the present invention will he described below with reference to FIGS. 15A through 18.

The vehicle lighting actuating apparatus 101a is constituted by a body case 102a including a transformer receiving portion 103a, and a synthetic resin socket portion 120a; and a lighting transformer 130a.

Figure 16A:
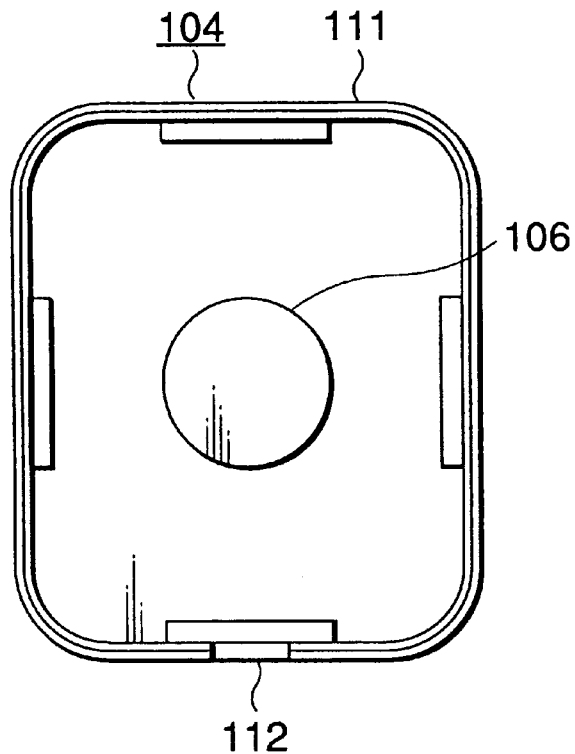
FIGS. 16A, 16B and 16C are front, side and bottom views of the half box portion according to the third embodiment of the present invention, respectively.
Figure 16B:
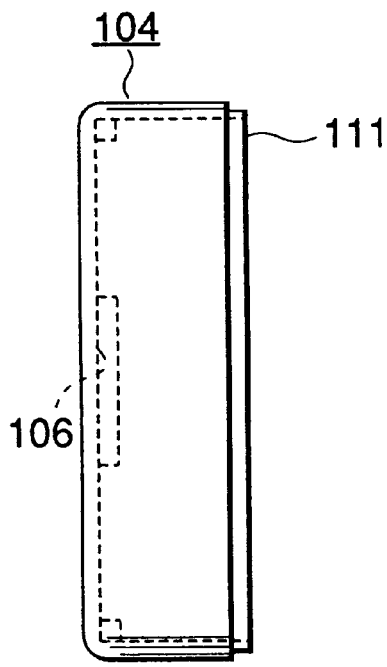
Figure 16C:
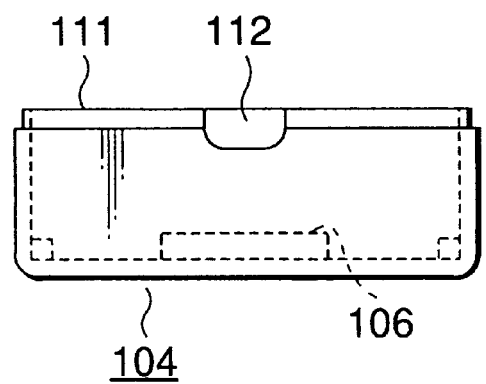
Figure 17B:
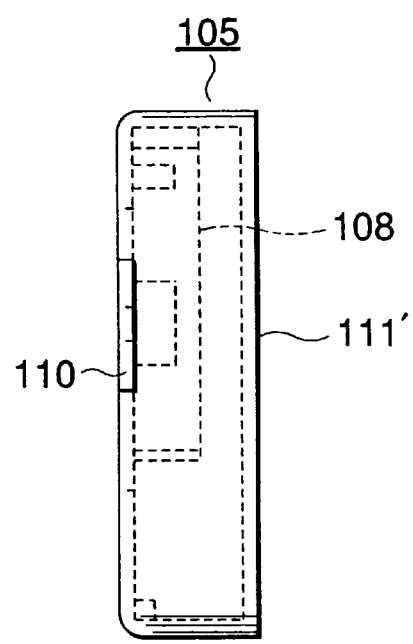
FIGS. 17A, 17B and 17C are front, side and bottom views of the half box portion according to the third embodiment of the present invention, respectively.
Figure 17A:
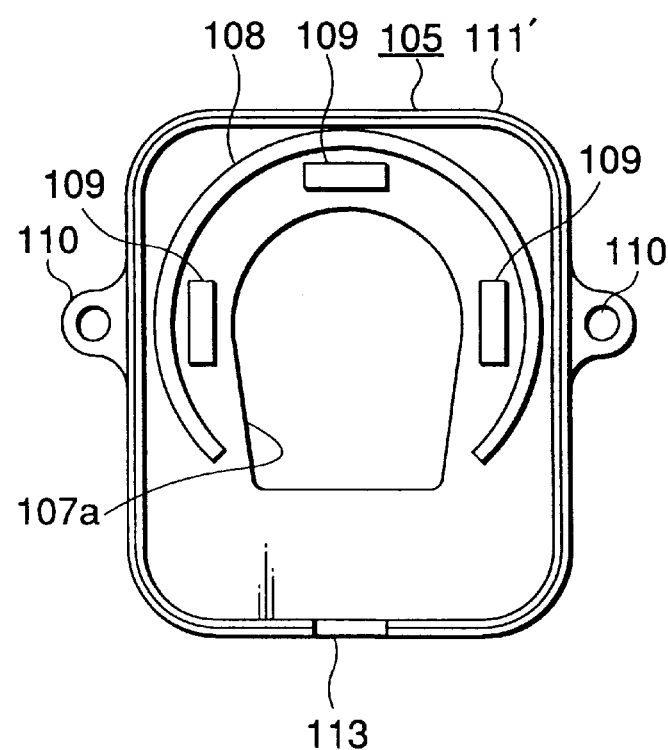
Figure 17C:
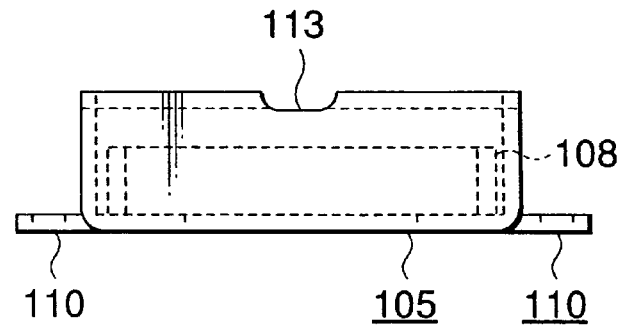

The transformer receiving portion 103a of the body case 102a is constituted by assembling a pair of rectangular parallelepiped synthetic resin half box portions 104 and 105 having the same one end surface shape with one side surface opened. As shown in FIGS. 16A to 16C, the rear half box portion 104 has a limiting protrusion surface 106 formed on the inner surface of the rear wall thereof. As shown in FIGS. 17A to 17C, on the other hand, the front half box portion 105 has an opening 107a formed in the front wall thereof, a notch-like annular protrusion 108 formed on the inner surface of the front wall, and a plurality of limiting protrusions 109 formed on the inside of the annular protrusion 108. To facilitate fixing in a lamp housing, mount ears 110 and 110 are formed on opposite side surfaces of the front half box portion 105 so as to project therefrom. As will be described later, the lighting transformer 130a is disposed in the transformer receiving portion 103a. Accordingly, a large load is imposed on the rear of the mount ears 110 and 110 so that the discharge lamp side strongly jolts as the car jolts. To fix the lighting transformer 130a firmly as a whole, therefore, the mount ears 110a may be extended to the vicinity of the rear surface of the half box portion 104 as indicated by the chain line in FIG. 15B.

Fitting step edges 111 and 111' are formed on abutment edges of the half box portions 104 and 105 and rectangular notches 112 and 113 are formed in the abutment edges respectively so that a lead wire insertion hole 114 is formed of the rectangular notches 112 and 113 in a state in which the fitting step edges 111 and 111' are fitted to each other.

On the other hand, the socket portion 120a is constituted by a mount base portion 121 which has a shape corresponding to the opening 107a so as to engage with the inner edge of the opening 107a, and a cylindrical connection portion 122 which is continuously formed in the front of the mount base portion 121. A high potential side connection terminal 123 is disposed at the center of the connection portion 122 and a low potential side connection terminal 124 is disposed along the inner circumferential surface of the connection portion 122. Those terminals 123 and 124 are projected so that lead wires can be connected to the connection terminals 123 and 124 respectively from the back of the mount base portion 121. Although this configuration shows the case where a socket portion is constituted by the socket portion 120a, the socket portion may be formed integrally with the front half box portion 105.

Figure 19:
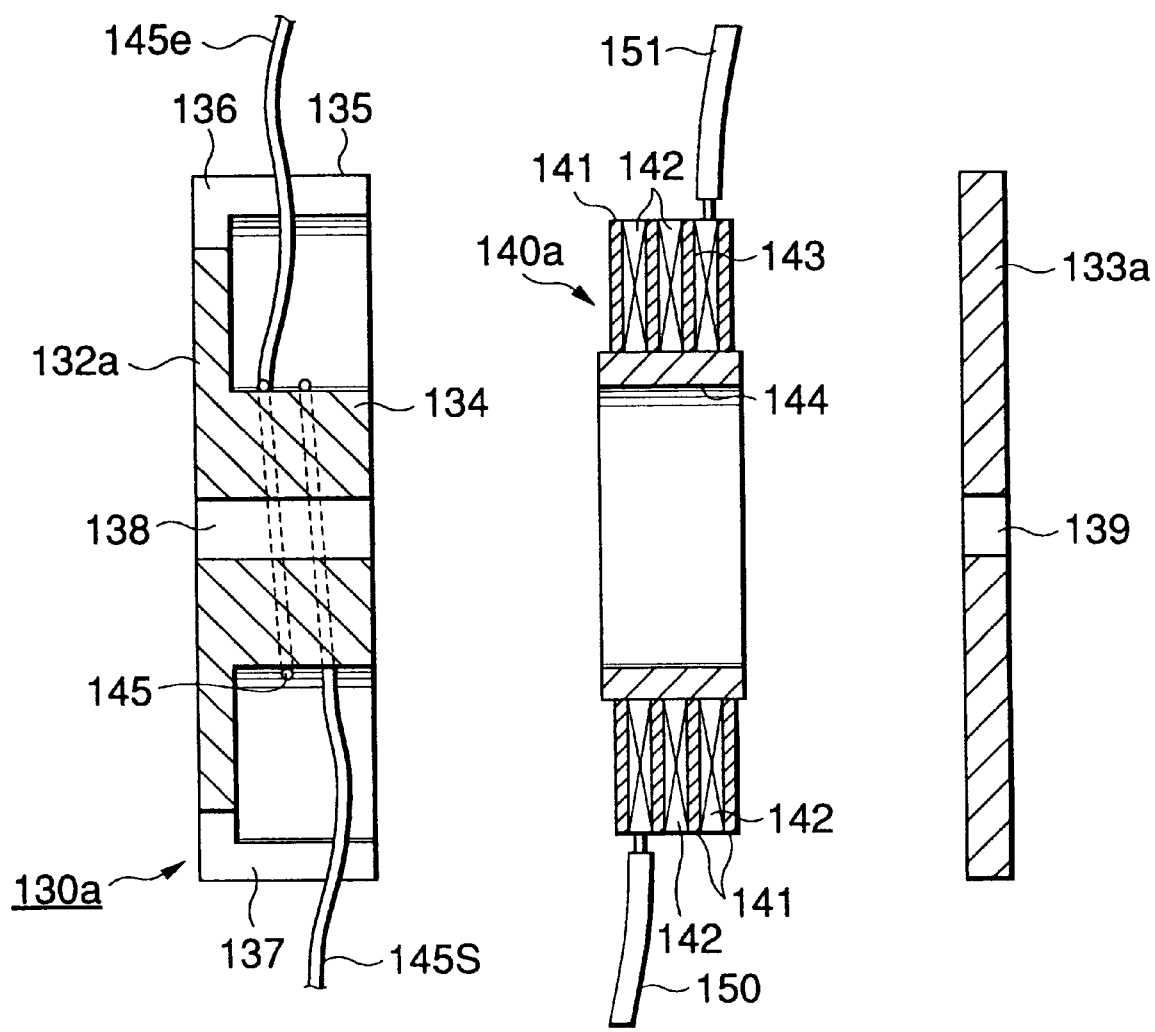
FIG. 19 is an exploded vertical sectional view of the lighting transformer according to the third embodiment of the present invention.

The configuration of the lighting transformer 130a will be described below with reference to FIG. 19.

The lighting transformer 130a has a coil bobbin 140a received in a disk-like core box 131a.

Half core portions 132a and 133a, which have equal outer diameters to each other and which are formed from a magnetic material such as ferrite, or the like, are placed one on the other to thereby form the core box 131a. As shown in FIG. 19, one half core portion 132a has an iron core portion 134 which is continuously formed at its center, and has circumferential side portions 135 which are continuously formed in symmetric positions of the outer circumference of the iron core portion 134 and provided with lead wire draw-out holes 136 and 137 respectively. Further, the other half core portion 133a is shaped like a disk connected to the opening of the half core portion 132a. Further, the half core portions 132a and 133a are provided with through-holes 138 and 139 formed in their centers respectively.

The coil bobbin 140a is formed from a synthetic resin material so that a secondary coil 143 is continuously wound in split circumferential grooves 142 separated by a plurality of flange portions 141. The coil bobbin 140a has a center hole 144 fitted onto the iron core portion 134.

The secondary coil 143 wound in the split circumferential grooves 142 has a winding start connected to the low voltage side lead wire 150, and a winding end connected to the high voltage side lead wire 151. A primary coil 145 is wound by about two turns on the iron core portion 134 on the side portion of the coil bobbin 140a. After the low voltage side winding start 145s of the primary coil 145 and the low voltage side lead wire 150 are drawn out to the through-hole 136 and the high voltage side winding end 145e of the primary coil 145 and the high voltage side lead wire 151 are drawn out to the through-hole 137, electrically insulating resin is injected into the half core portion 132a to bond the half core portion 132a to the half core portion 133a. As a result, the coil bobbin 140a, the secondary coil 143 and the primary coil 145 are disposed in the core box 131a constituted by the half core portions 132a and 133a so that the lighting transformer is formed and the lower voltage side and high voltage side lead wires 150 and 151 connected to the winding start 145s and winding end 145e of the primary coil 145 and the secondary coil 143 are drawn out to the outside.

As described above, the lighting transformer 130a is covered with the core box 131a, so that the lighting transformer 130a has a uniform unit structure. Accordingly, the lighting transformer 130a is well arranged and it is merely necessary that a simple gap is formed in the transformer receiving portion 103a as described above. Accordingly, the lighting transformer 130a can be constituted by the simple-structure half box portions 104 and 105 placed one on the other. Further, electrical connection is facilitated in the transformer receiving portion 103a. Furthermore, because the core box 131a is formed from a magnetic material, the number of constituent parts can be reduced when the iron core portion 134 is formed integrally with the core box 131.

The outer diameter of the core box 131a is set so as to fit to the inner diameter of the annular protrusion 108 of the front half box portion 105. Therefore, not only the front surface of the lighting transformer 130a is fitted into the annular protrusion 108 but also the lighting transformer 130a is held between the limiting protrusions 109 and a printedwiring substrate 160 (which will be described in the following) so as to be received stably in the transformer receiving portion 103a.

Figure 18:
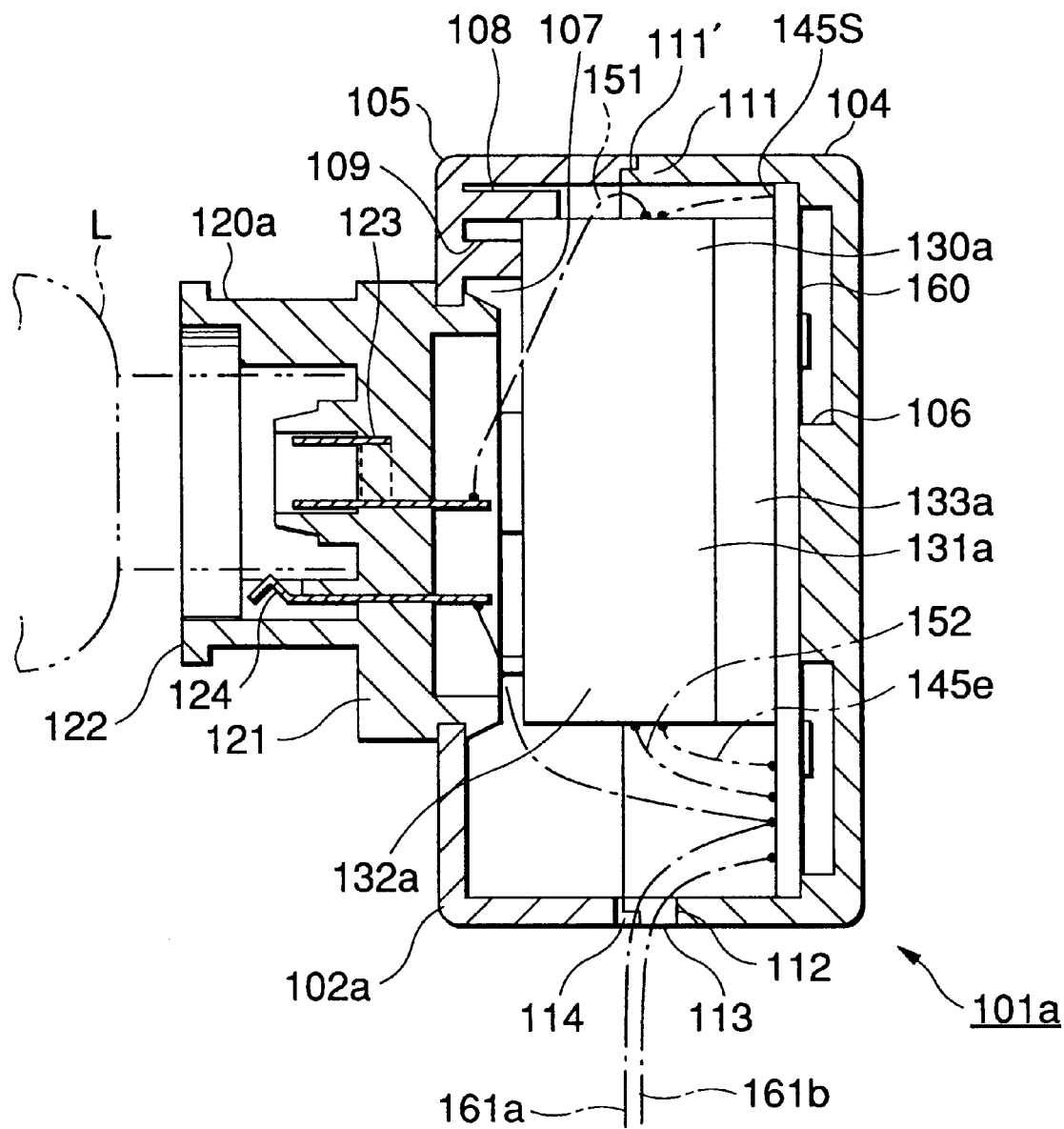
FIG. 18 is a sectional view taken along the line A'—A' in FIG. 15A.

As shown in FIG. 18, the printed-wiring substrate 160 is disposed in the half box portion 104 and the back of the printed-wiring substrate 160 is mounted on the limiting protrusion surface 106 so that the printed-wiring substrate 160 is held between the limiting protrusion surface 106 and the back of the core box 131a. Lead wires 161a and 161b to be drawn out to the outside are connected to electric paths respectively in the printed-wiring substrate 160 and dawn out to the outside through the through-hole 114.

The high voltage side lead wire 151 drawn out of the core box 131a is connected to the connection terminal 123 of the socket portion 120a whereas the low voltage side lead wire 150 is connected to a low voltage electric path (or the ground) of the printed-wiring substrate 160. Further, the winding start 145s and winding end 145e of the primary coil 145 are connected to required electric paths of the printed-wiring substrate 160 and further connected to the external lead wires 161a and 161b through a circuit mounted on the printed-wiring substrate 160. The connection terminal 124 is connected to the low voltage side lead wire 150 or to the low voltage electric path (or the ground) of the printed-wiring substrate 160 separately as shown in FIG. 18.

In the aforementioned configuration, a voltage applied from the external lead wires 161a and 161b is connected to a required circuit of the printed-wiring substrate 160, so that a primary voltage of about 400 V is applied to the primary coil 145 through the circuit and through the winding start 145s and the winding end 145e and boosted to 13 kV or more by the secondary coil 143. This high voltage is applied to the connection terminal 123.

The thus configured vehicle lighting actuating apparatus 101a is attached in a lamp housing mounted on the front portion in an engine room of a car. A discharge lamp L (see FIG. 18) such as a metal halide lamp, or the like, is fitted to the connection portion 122. The connection terminal 124 is connected to the surrounding electrode of the discharge lamp whereas the connection terminal 123 is connected to the core electrode of the discharge lamp, so that a high voltage of about 18 kV is applied to the discharge lamp to turn on the discharge lamp.

Figure 20:
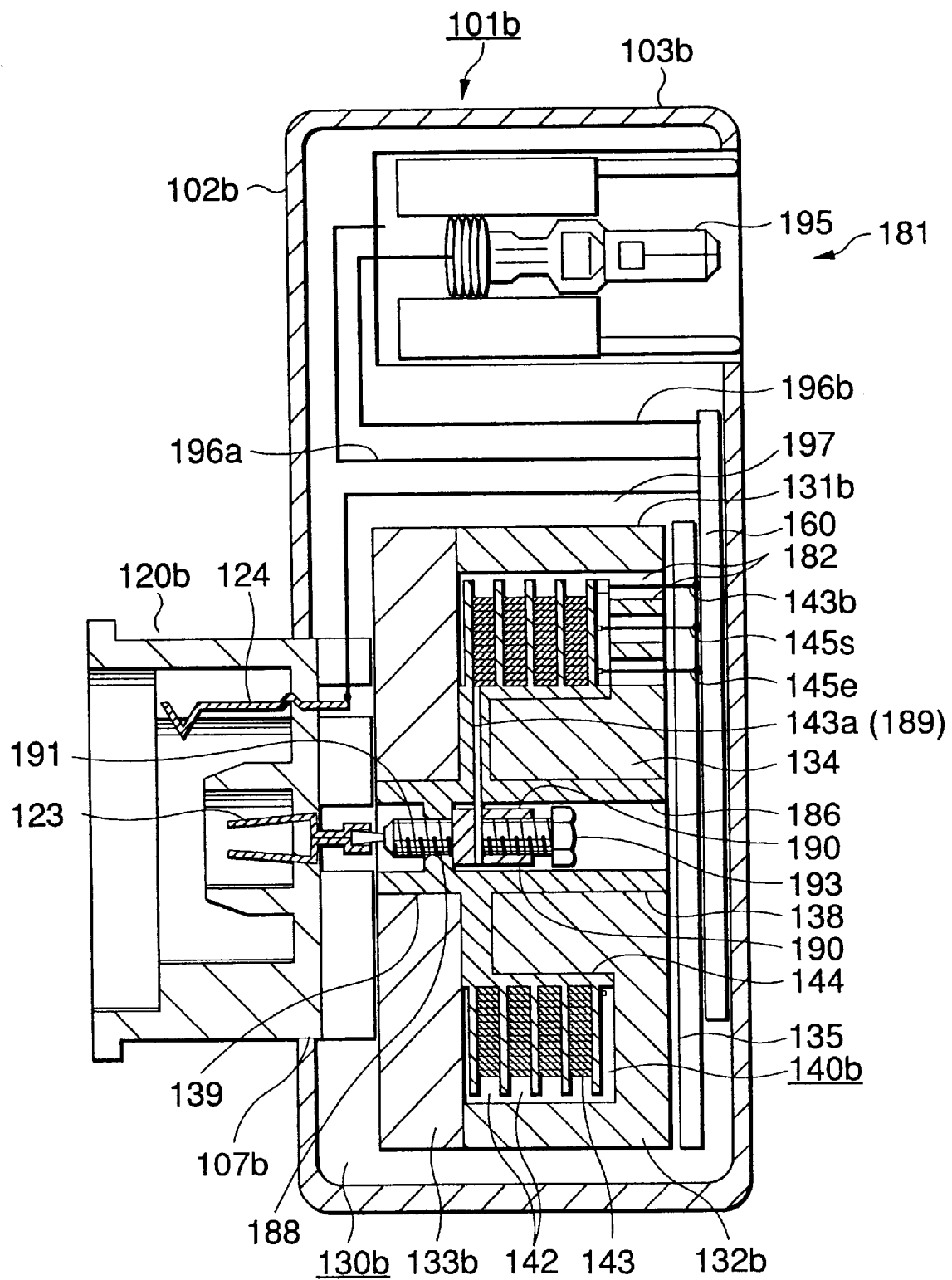
FIG. 20 is a vertical sectional view of the vehicle lighting actuating apparatus according to a fourth embodiment of the present invention.

A fourth embodiment of the present invention will he described below with reference to FIGS. 20 and 21.

This vehicle lighting actuating apparatus 101b is constitutod by a body case 102b including a transformer receiving portion 103b, and a synthetic resin socket portion 120b; and a lighting transformer 130b. Parts the same as those in the third embodiment are correspondingly referenced, and the description thereof will be omitted.

Here, the transformer receiving portion 103b of the body case 102b is shaped as an unit rectangular parallelepiped structure and has an opening 107b formed in the front wall and a connection opening 181 formed in the rear wall. The lighting transformer 130b is disposed in the transformer receiving portion 103b.

On the other hand, the socket portion 120b has a rear portion fitted into the opening 107b. Similarly to the first embodiment, a high potential side connection terminal 123 is disposed at the center of the socket portion 120b and a low potential side connection terminal 124 is disposed along the inner circumferential surface of the socket portion 120b. The connection terminals 123 and 124 project so that lead wires can be connected thereto respectively.

The configuration of the lighting transformer 130b will be described below with reference to FIGS. 20 and 21.

This lighting transformer 130b has a coil bobbin 140b received in a disk-like core box 131b. Similarly to the first embodiment, half core portions 132b and 133b which have equal outer diameters to each other and which are formed from a magnetic material such as ferrite, or the like, are placed one on the other to thereby form the core box 131b. One half core portion 132b has an iron core portion 134 continuously formed at the center. A plurality of lead wire draw-out holes 182 are formed in the back of the half core portion 132b. The other half core portion 133b is shaped like a disk connected to the opening of the half core portion 132b. Further, the half core portions 132b and 133b are provided with through-holes 138 and 139 at their centers respectively.

Figure 21:
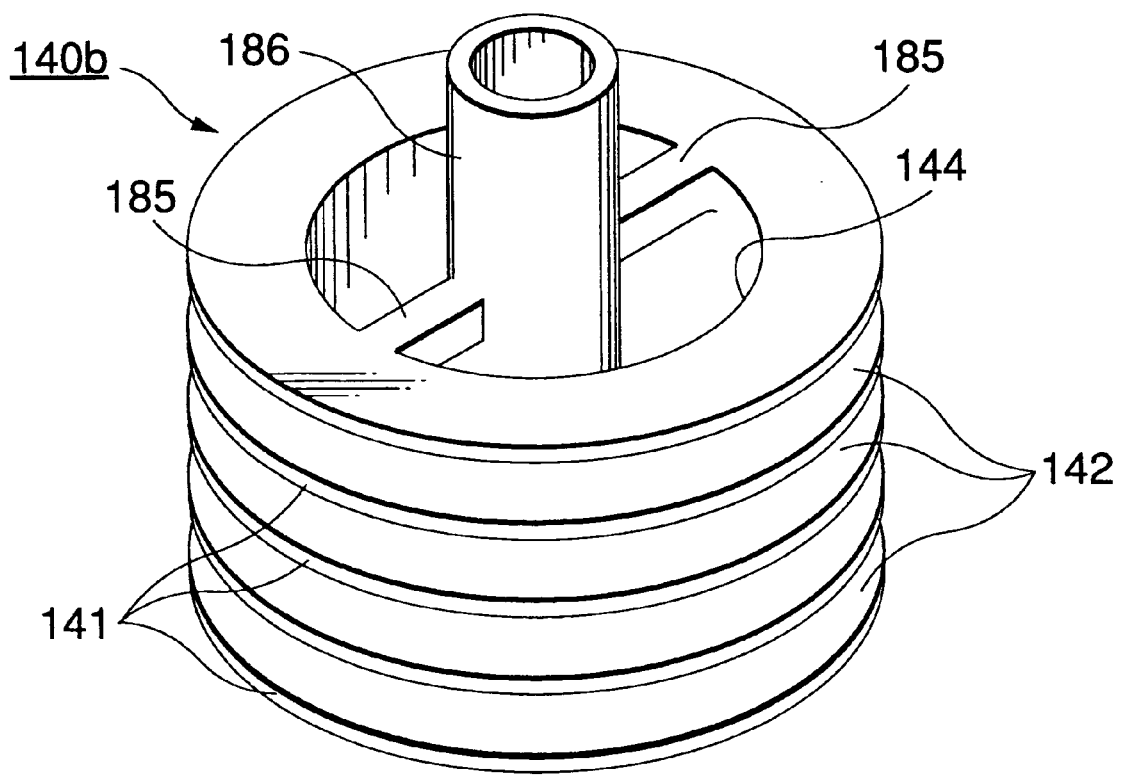
FIG. 21 is a perspective view of the coil bobbin according to the fourth embodiment of the present invention.

As shown in FIG. 21, the coil bobbin 140b is formed from a synthetic resin material and a secondary coil 143 is continuously wound in split circumferential grooves 142 separated by a plurality of flange portions 141. The coil bobbin 140b has a center hole 144 fitted onto the iron core portion 134. A connection pipe portion 186 is formed at the center of the coil bobbin 140b so as to be supported by connection portions 185. The connection pipe portion 186 has front and rear ends which are inserted into the through-holes 138 and 139 formed at the centers of the half core portions 132b and 133b respectively.

A female screw 188 is formed in the cross wall of the connection pipe portion 186. The winding start 143a of the secondary coil 143 is extended linearly to form a current conduction portion 189. An end portion of the current conduction portion 189 is disposed so as to be opposite to the female screw 188. A headed connector 190 having a male screw 191 and formed from an electrically conductive material is thread-engaged with the female screw 186. When the current conduction portion 189 is inserted into the head portion 192 of the connector 190 and screwed up with a bolt 193, the connection of the female screw 108 to the connector 190 is secured. Further, the front end of the male screw 191 is connected to the connection terminal 123, so that an end portion of the secondary coil is connected to the connection terminal 123.

On the other hand, lead wires 145e and 145s for connecting the winding end 143b of the secondary coil 143 and opposite ends of the primary coil (or end portions of the coil) are inserted into the draw-out hole 182 and connected to the printed-wiring substrate 160 fixed on the rear wall of the transformer receiving portion 103b.

A connector 195 is provided in the upper portion of the transformer receiving portion 103b so as to be opposite to the connection opening 181. Further, the respective other ends of lead wires 196a and 196b with their one ends connected to required electric paths of the printed-wiring substrate 160 are connected to the connector 195. A connector of a feeder cable extended from the electric source side can be fitted to the connector 195 through the connection opening 181 so that the connection to the external lead wires 161a and 161b (see FIG. 18) is facilitated. The connection terminal 124 is connected to the low potential electric path of the printed-wiring substrate 160 through a lead wire 197.

In addition, electrically insulating resin is injected into the half core portion 132b.

Although the fourth embodiment has shown the case where the secondary coil and the winding start 189 are held between the headed terminal 190 and the bolt 193 when they are to be connected to the high voltage side connection terminal 123 of the socket portion, an extension portion 123a may be extended from the lower end of the connection terminal 123 as shown in FIG. 22 and a lock groove 123b having a plurality of teeth formed along the inner edge may be formed on the extension portion 123a so that the end portion 189 of the secondary coil is fitted into and locked to the lock groove 123b to thereby perform electrical connection. This configuration has an advantage that connection can be performed through one touch operation.

As described above, according to the present invention, a socket portion is provided to project from one side surface of a transformer receiving portion 103b to thereby form a body case, and a lighting transformer is received in the transformer receiving portion 103b of the body case, so that a high voltage side output end of a secondary coil of the lighting transformer is electrically connected to a terminal provided in the socket portion and a primary coil of the lighting transformer is connected to an external electric path directly or through a circuit portion. Accordingly, the transformer receiving portion 103b and the socket portion can be integrally formed with each other to thereby form a unit structure.

Accordingly, the lighting transformer and the socket are well arranged in the lamp housing, so that no additional place is required and the number of constituent parts is reduced. Accordingly, the design of arrangement is facilitated without requiring any high-voltage cable which may generate electromagnetic wave so that the maloperation of an electronic control circuit mounted in a vehicle can be prevented and voltage loss due to the high-voltage cable can be eliminated.

Further, the lighting transformer is configured so that a core box is constituted by two half core portions formed from a magnetic material; a coil bobbin formed from an electrically insulating material and wound with the secondary coil on the outer circumference thereof is fitted to the iron core portion formed continuously in the core box; and the primary coil is wound on the iron core portion. In such a configuration, because the core box is formed from a magnetic material such as ferrite, or the like, the iron core portion may be formed by the core box per se and assembling is facilitated. Further, because the bobbin is covered with the core box firmly, good arrangement is provided so that the gap for receiving the transformer in the transformer receiving portion can be formed easily. Thus, the housing is simplified in structure and electrical connection in the housing is performed easily.

Further, in the configuration in which the body case is formed into a split structure which is constituted by two half box portions and a socket portion, those portions can be formed separately. Accordingly, the lighting drive apparatus can be produced easily by assembling those portions.

What is claimed is:

1. A vehicle lighting actuating apparatus comprising:
    a body case having a transformer receiving portion and a socket portion projecting from one side of said transformer receiving portion, to which a vehicle discharge lamp is to be connected;
    a lighting transformer received in said transformer receiving portion;
    terminals provided in said socket portion;
    a secondary coil of said lighting transformer;
    terminals provided in said socket portion, which are electrically connected to said secondary coil; and
    a primary coil connected to an external electric path.

2. A vehicle lighting actuating apparatus according to claim 1, wherein said primary coil is connected to the external electric path directly.

3. A vehicle lighting actuating apparatus according to claim 1, wherein said primary coil is connected to the external electric path through a circuit portion.

4. A vehicle lighting actuating apparatus according to claim 1, wherein said lighting transformer comprises:
    two half core portions comprising a magnetic material and placed one on the other;
    an iron core portion formed at a center of said two half core portions integrally therewith, said iron core portion and said two half core portions forming a core box; and
    a coil bobbin comprising electrically insulating material on which said second coil is wound, said coil bobbin being fitted to said iron core portion;
    wherein said primary coil is wound on said iron core portion.

5. A vehicle lighting actuating apparatus according to claim 1, wherein:
    said transformer receiving portion comprises two synthetic resin half box portions which are placed one on the other;
    said socket portion comprises synthetic resin, which is fitted into an opening formed in a side surface of a front one of said half box portions;
    wherein a high voltage side output terminal of said secondary coil is connected to said terminals provided in said socket portion through said opening.

6. A vehicle lighting actuating apparatus according to claim 1, further comprising
    a core box having an iron core portion; and
    a coil bobbin comprising an electrically insulating material on which said secondary coil is wound, said coil bobbin being fitted to said iron core portion;
    wherein said primary coil is wound on said iron core portion;
    said terminals including a center terminal and an outer terminal, each being connected to each end of said secondary coil of said lighting transformer;
    said coil bobbin has a connection tube portion having a wiring hole in an inside thereof, said connection tube portion being passed through said iron core portion, said connection tube portion being provided to be eccentric to one side with respect to an annular winding path of said secondary coil on said coil bobbin;
    said lighting transformer is disposed in said body case so that said connection tube portion substantially coincides with said socket; and
    a high voltage side output end of said secondary coil inserted into said wiring hole is connected to said center terminal of said socket.

7. A vehicle lighting actuating apparatus according to claim 6, wherein said annular winding path of said lighting transformer is shaped substantially a quadrilateral.

8. A vehicle lighting actuating apparatus according to claim 6, wherein
    said coil bobbin has a plurality of split circumferential grooves partitioned by a plurality of flange portions; and
    said flange portions are wound with said secondary coil, and said flange portion has a slit having a depth reaching a groove surface of said split circumferential grooves so that said secondary coil passes through said slit.

* * * * *